May 21, 1963  R. W. HANZEL  3,090,118
METHOD OF MAKING A COOKING VESSEL
Filed April 16, 1959
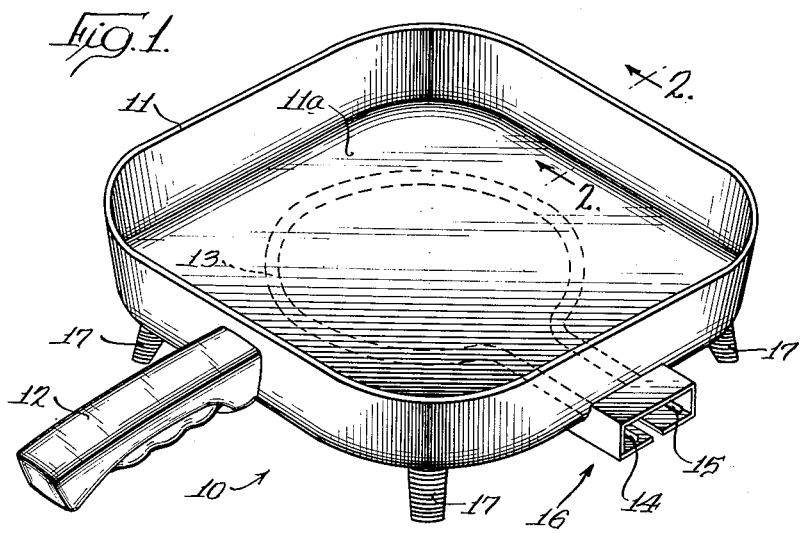
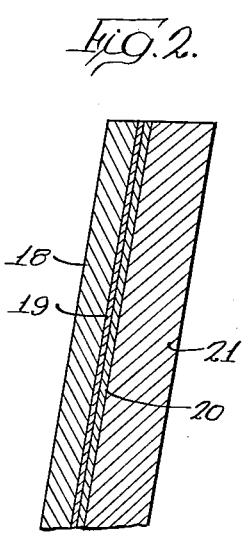
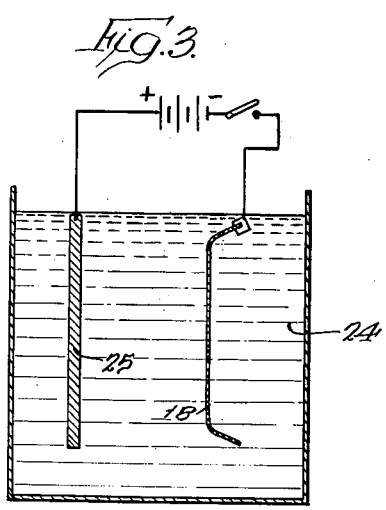
INVENTOR.
Richard W. Hanzel
BY
George R. Clark
ATTY.

United States Patent Office 3,090,118
Patented May 21, 1963

3,090,118
METHOD OF MAKING A COOKING VESSEL
Richard W. Hanzel, La Grange Park, Ill., assignor to Sunbeam Corporation, Chicago, Ill., a corporation of Illinois
Filed Apr. 16, 1959, Ser. No. 806,982
6 Claims. (Cl. 29—527)

The present invention relates to an improved cooking vessel and also to an improved method of making cooking vessels, and it more particularly relates to methods of making cooking vessels formed of laminations of stainless steel and aluminum.

The trend in cooking vessels has changed radically within the last few years. This trend began with the development of the completely automatic self-contained cooking vessel immersible in liquid for cleaning purposes disclosed in Jepson Patent No. 2,744,995, granted May 8, 1956, and assigned to the same assignee as the instant application. Since that time numerous manufacturers have placed cooking vessels of various types and designs on the market, the attempt always being to provide a cooking vessel which is self-contained and yet which may be readily cleaned by immersing it in a celaning liquid. Obviously, the housewife of today is not satisfied with a cooking vessel which cannot be immersed in liquid.

The problem of manufacturing such cooking vessels so that they can be immersed for cleaning purposes has not been a simple one to solve, and manufacturers have made the vessels in various ways. Some of these vessels have been made as castings of light metal, such as aluminum, with the heating elements embedded within the casting. The vessels have also been drawn from sheet metal with the necessity of soldering and welding the joints to insure immersibility of the complete vessel.

It has long been appreciated that the ideal cooking vessel is one that has an interior surface which is nonporous and which is not affected by the various foods and materials to which it is subjected during the cooking operation. Such metals as stainless steel, titanium, and the like are ideal for this purpose. They do not tarnish with use, they provide a surface which can be cleaned with ease regardless of the foods to which the surface is subjected during the cooking operation, and they are sufficiently dense so that there are no pores or the like in which the food can collect. A cooking surface, therefore, made of stainless steel would, from that standpoint, be desirable and would eliminate the necessity of coating the cooking surface of such cooking vessels with some suitable material as is now commonly the case.

Unfortunately, metals such as stainless steel and titanium are not good conductors of heat and are in an entirely different class from such metals as aluminum and copper which are very good conductors of heat. If the stainless steel cooking surface could have a heating element applied thereto which was distributed over the entire surface then the conductivity thereof would not be important. As a practical matter, electrical heating elements are usually in the form of a sheathed element or a similar element which provides almost line contact with the cooking surface to be heated, and it is neither practical nor economical to include a heating element in contact with the entire cooking surface to insure uniform distribution of heat. In fact, it is usual to have either a C-shaped or looped heating element of substantial area engaging the bottom of the cooking vessel. Such a construction eliminates stainless steel as a satisfactory metal for the entire cooking vessel, and it is for this reason that most of the automatic cooking vessels of today are manufactured from aluminum which provides a very satisfactory heat distribution. Unfortunately, however, aluminum is not as satisfactory as stainless seel for a cooking surface.

It has been suggested to manufacture cooking vessels of multilayer materials having the cooking surface defined of a more desirable material such as stainless steel or the like, and to apply to the opposite side of the cooking surface a metal of good heat conductivity in contact with a heating element to spread the heat uniformly to the cooking surface. As a matter of fact, cooking vessels have been manufactured with a stainless steel liner and external shell of aluminum. However, many of these devices have not been altogether satisfactory because of the poor bond which is provided between the stainless steel liner and the exterior of the aluminum. Such multiwalled vessels have been cut apart and it has been found that there were many voids between the liner and the exterior shell which completely defeat the purpose of the multilayer construction, since the air in the voids is even less satisfactory as a heat conductor than the stainless steel itself. In a copending Jepson application, Serial No. 723,877, filed on March 25, 1958, now Patent Number 3,017,492 and assigned to the same assignee as the present invention, there are disclosed a variety of methods of manufacturing cooking vessels having stainless steel liners mechanically bonded to backings of cast metal such as aluminum. Also, in a copending Hanzel application, Serial No. 723,893, filed March 25, 1958, and assigned to the same assignee as the instant application, there is disclosed an improved cooking vessel and method of making the same wherein a stainless steel liner is molecularly bonded to a backing layer or shell of cast aluminum. However, an intermediate metal member is interposed between the aluminum and the stainless steel to insure a good bond in accordance with this process.

Attempts have been made to bond stainless steel directly to aluminum with a so-called furnace bond, and actual metallurgical bonding has been obtained by the formation of aluminum iron alloy at the interface of the aluminum and stainless steel. However, this aluminum iron alloy was relatively thick and extremely brittle to the extent that when deformed into the shape of a cooking vessel the bonding would be destroyed. In attempting to eliminate the brittle bond between the aluminum and stainless steel, intermediate materials have been employed which are more readily capable of forming a molecular bond with stainless steel and with aluminum than are aluminum and stainless steel. One very good way of securing the aluminum layer to the stainless steel liner is disclosed in the above referred to Hanzel application, and in accordance with a specific method disclosed in that application a copper sheet is first brazed to one face of the stainless steel liner and then the aluminum layer is cast over the copper. Although this process provides a very satisfactory product, it would be desirable to bond the aluminum to the stainless steel liner without using the intermediate copper sheet.

Accordingly, it is an object of the present invention to provide an improved cooking vessel of the multilayer type having a metallurigical bond between the layers to insure a good heat transfer.

It is another object of the present invention to provide an improved process of making a cooking vessel.

Still another object of the present invention is to provide a new and improved process for bonding stainless steel to aluminum.

It is a further object of the present invention to provide an excellent bond of high reproducibility between a stainless steel member and an aluminum member by electroplating layers of metals on the stainless steel member which combines metallurgically with aluminum when the latter is cast thereon.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawing, in which:

FIG. 1 is a perspective view of a cooking vessel embodying the present invention;

FIG. 2 is a greatly enlarged fragmentary, sectional view taken on line 2—2 of FIG. 1; and FIG. 3 is an elevational schematic view, in section illustrating one step in the process of making a cooking surface in accordance with the present invention.

Briefly, in accordance with one aspect of the present invention, there is provided an improved material which finds particular utility in cooking vessels, such as frying pans and the like, and in accordance with another aspect of the invention there is provided an improved process for producing this material.

Referring now to FIG. 1 of the drawing, there is illustrated a cooking vessel generally indicated at 10 which may have any desired shape or size. By way of example, this cooking vessel has been illustrated as a frying pan of the general shape and construction of the cooking vessel shown in a copending Jepson and Wickenberg application, Serial No. 739,876, filed June 4, 1958, and assigned to the same assignee as the instant application. As illustrated, it comprises a vessel portion 11 having secured thereto a handle 12. In intimate heat exchange relationship with the bottom 11a of the vessel 11 is a heating element 13, preferably of the well-known sheathed type. The heating element 13 is illustrated as being somewhat C-shaped, with a set of terminal portions 14 and 15 thereof extending into a plug receptacle 16 for receiving a suitable power cord. In the case of an automatically controlled cooking vessel, the receptacle 16 may also receive a temperature control device (not shown). The vessel 10 is provided with a plurality of supporting legs 17, preferably formed of insulating material whereby the surface on which the vessel 10 is placed will not be damaged during a cooking operation.

In FIG. 2 of the drawing there is illustrated a section of the cooking vessel portion 11 comprising a stainless steel inner liner 18 on which a nickel strike 19 has been electroplated. A protective layer 20 of a suitable metal is electroplated over the nickel strike 19 to prevent the formation of oxides or contaminants on the nickel and to provide a uniform molecular bond with an aluminum heat transferring layer or shell 21 which is cast directly over the protective layer 20. As is described in greater detail hereinafter, the aluminum heat transfer layer 21 is preferably cast over the electroplated surfaces of the liner 18 in a die or gravity casting operation and the heating coil 13 is embedded in the aluminum shell 21 at that time.

Preferably, the first step in the process of manufacturing the cooking vessel 10 of the present invention is to deform the stainless steel sheet into the final desired shape whether it be a flat plate as in the case of a grill, a shallow vessel as in the case of a frying pan, or a deeper vessel as in the case of a saucepan. Then the deformed sheet of stainless steel, which might be the liner 18, has a nickel strike 19 electroplated thereon. To accomplish this, the deformed sheet such as liner 18 is immersed, as illustrated in FIG. 3, in a bath 24 of a suitable nickel strike plating solution such, for example, as a "Woods" bath, which forms an excellent nickel strike electroplating solution of an aqueous nature. This bath contains approximately 32 ounces per gallon nickel chloride and hydrochloric acid in a concentration of about 12% by volume. One or more nickel anodes 25 are also immersed in the bath, and the electroplating is conducted for about two minutes with a current density of about 150 amperes per square foot of plating area with the bath at a temperature of approximately 75 degrees F. The nickel film or strike which is thus formed should be at least 0.000025 of an inch in thickness but no greater than about 0.0005 of an inch in thickness. The highly chloride nature of the bath removes the surface oxide from the exposed faces of the stainless steel member 18, and the nickel strike which is electroplated thereon is strongly bonded thereto and protects the surface from reoxidation. If desired, the inside of the liner 18 may be masked in a suitable manner so no strike is formed thereon, but actually this is unnecessary since it is a simple matter to remove this strike later. Also, two liners 18 may be placed with their open sides abutting and their abutting edges sealed together by any suitable waterproof composition whereby the exterior of two liners will be simultaneously plated and no strike will be formed on the inside of either.

In order to prevent contamination of the nickel strike by the formation of oxides and also to provide a metallic surface which is tenacious to nickel and which can be alloyed with aluminum to form a good interface between the nickel strike 19 and the aluminum layer 21, the second or protective plating 20 is applied to the nickel strike as soon as possible after the strike has been produced. The protective layer 20 may be composed of tin, cadmium or silver, but is preferably tin or cadmium since these latter metals have been found to produce a considerably more reproducible bond with cast aluminum. The thickness of the protective layer 20 should be between 0.0002 of an inch and 0.0004 of an inch, the high limit being necessary because of the formation of excessive amounts of low melting constituents if too much of this layer is present. The layer 20 is preferably plated over the nickel strike 19 by placing the nickel strike plated members in an aqueous solution comprising sodium stannate of four ounces per gallon, sodium hydroxide of one and one-half ounces per gallon, sodium acetate of two ounces per gallon, and 30% hydrogen peroxide of $\frac{1}{16}$ of an ounce per gallon. The plates are then electroplated for about thirty minutes with a current density of 20 amperes per square foot using tin anodes with the bath at a temperature of about 160 degrees F. This produces a tin plating of about 0.0003 of an inch in thickness.

If the protective layer 20 is to be cadmium, it is applied in an aqueous solution comprising two to three ounces of cadmium metal per gallon, 16 to 18 ounces of free cyanide per gallon, 3 to 6 ounces of sodium carbonate per gallon, and 2.0 to 2.5 ounces of sodium hydroxide per gallon. The bath is maintained at a temperature of between 75 and 80 degrees F., and the electroplating is continued for about twelve minutes with a current density of about 20 amperes per square foot of plating area using cadmium anodes. The plating thus produced is about 0.0003 of an inch in thickness.

If the protective coating 20 is to be silver, a silver strike is first applied to the nickel strike 19, and thereafter a silver plating is electrolytically deposited over the silver strike. The silver strike is electroplated onto the nickel strike in an aqueous solution containing 0.9 ounce of silver cyanide per gallon, 10.0 ounces of potassium cyanide per gallon, and 9.5 ounces of free cyanide per gallon. The solution is maintained at about 75 degrees F. during the striking operation which is conducted for one minute with a current density of about 30 amperes per square foot of plating area with steel anodes. In order to silver plate the silver strike, the electroplating operation is conducted for about 22.5 minutes with the bath at about 85 degrees F. and with a current density of about 5 amperes per square foot of plating area using silver anodes. The electrolytic bath is an aqueous solution comprising 4.8 ounces of silver cyanide per gallon, 8.0 ounces of potassium cyanide per gallon, 6.0 ounces of potassium carbonate per gallon, 5.7 ounces of free cyanide per gallon, and 4.7 troy ounces of silver metal per gallon. This process forms a protective layer of silver which is approximately 0.0003 inch.

When the layer 20 consists of either tin or cadmium, oxides will be formed on the exposed surface, but these oxides do not inhibit alloying of the aluminum and the metallic layer 20. When the layer consists of silver, there are no oxides present at the casting temperatures.

The deformed plated stainless steel sheets or plated liners 18 having the protective plating 20 thereon are now ready for the casting operation by means of which the aluminum layer 21 is applied thereto so as also suitably to embed the heating element 13. If the aluminum layer 21 is applied in a gravity casting operation, an aluminum alloy of type 13 or of type 43 is used, while an aluminum alloy of either type 360 or type 380 is used if the layer 21 is die cast over the exterior of the plated liner 18. Preferably, a die cast operation using the principles set forth in copending Jepson application, Serial No. 761,636, filed September 17, 1958, now Patent Number 3,007,219 and assigned to the same assignee as the instant application is employed. With the dies kept at a temperature at the loading stage of between 500 degrees F. and 650 degrees F., and preferably, however, between 500 and 600 degrees F., the deformed liner is placed within the dies without being preheated or at least without being preheated to temperatures substantially above the temperatures of the dies. Thereafter, the aluminum is cast over the liner at the conventional casting temperatures for the particular aluminum alloy being used. The casting temperature will usually be between 1000 degrees F. and 1400 degrees F., depending on the alloy being used.

The surface layer 20, which, as described hereinbefore, is formed of tin, cadmium or silver, prevents contamination of the nickel strike 19 prior to the casting operation and, perhaps more importantly, provides a coating of a metal which is tenacious to the nickel and which alloys readily with the aluminum during the casting operation. Accordingly, a uniform heat conducting and molecular bond is provided between the aluminum heat conducting layer 21 and the stainless steel liner 18.

While the specific laminated device described above has been, for purposes of illustrating the invention, a frying pan, and while the process of the present invention is particularly useful in conjunction with this device and other cooking vessels, it is obvious that the present invention may be used to form any laminated structure in which an aluminum layer is strongly and uniformly bonded to a stainless steel layer. Such a structure might, for example, be the sole plate of a sadiron, a hot plate, or a heating panel.

Also, as an alternative step in the method described above, the sheets of stainless steel may be plated prior to being drawn into the shape of the desired cooking vessel, but with this latter alternative there is always the possibility of interfering with the bond during the drawing operation.

In the use of the terms "strike," "strike plating," "nickel strike" and the like in connection with the layer of nickel, it is intended to designate a thin plating of not greater than 0.0005 inch and preferably about 0.000025 inch applied in a highly reducing bath of the type such as the "Woods" bath, and to exclude plating from other types of nickel plating baths not of a highly reducing composition.

While particular embodiments of the invention have been shown, it will be understood, of course, that the invention is not limited thereto, since many modifications may be made, and it is, therefore, contemplated by the appended claims to cover any such modifications as fall within the true spirit and scope of the invention.

What is claimed as new and desired to be secured by Letters Patent of the United States is:

1. The method of making a laminated device, which comprises applying a strike of nickel to a face of a ferrous metal member, applying a plating of metal of the class consisting of tin, cadmium and silver to said strike of nickel, applying molten aluminum to said plating, and cooling the resulting assemblage to solidify said aluminum and fuse it with said bonding metal.

2. The method of making a laminated cooking vessel, which comprises deforming a ferrous metal member into the shape of a cooking vessel, applying a strike of nickel of a thickness at least 0.000025 of an inch to at least one side of said ferrous metal member, applying a plating of bonding metal of the group consisting of tin, cadmium and silver to said strike of nickel, applying molten aluminum to said plating, and cooling the resulting assemblage to solidify said aluminum and fuse it with said bonding metal.

3. The method of making a laminated device, which comprises strike plating nickel on a face of a stainless steel liner in a highly chloride bath, electroplating on the nickel a protective plating of a metal of the class consisting of tin, cadmium and silver, and casting an aluminum layer over said protective plating.

4. The method of making a laminated device, which comprises strike plating nickel on a face of a stainless steel liner, electroplating on the nickel a protective plating of a metal of the class consisting of tin, cadmium and silver to form an insert, placing the insert in a mold, heating the insert to a temperature of between about 500° F. and 750° F., and casting an aluminum layer over said protective plating.

5. The method of making a cooking vessel, which comprises forming a stainless steel liner for said vessel, strike plating nickel on the outside of said liner, electroplating on the nickel a protective plating of tin to form a plated liner, placing said plated liner in casting apparatus, and casting an aluminum layer over said protective plating.

6. The method of making a laminated cooking vessel, which comprises deforming a ferrous metal member into the shape of a cooking vessel, applying a strike of nickel of a thickness between 0.000025 to 0.0005 of an inch to at least one side of said ferrous metal member, applying a plating of bonding material from the group consisting of tin, cadmium, and silver of a thickness in the range of 0.0002 to 0.0004 of an inch to said strike of nickel, applying molten aluminum to said plating, and cooling the resulting assemblage to solidify said aluminum and fuse it with said bonding material.

References Cited in the file of this patent

UNITED STATES PATENTS

| | | |
|---|---|---|
| 2,243,979 | Reynolds | June 3, 1941 |
| 2,511,404 | Glenkey et al. | June 13, 1950 |
| 2,541,034 | Chace | Feb. 13, 1951 |
| 2,580,652 | Brennan | Jan. 1, 1952 |
| 2,611,163 | Schaefer et al. | Sept. 23, 1952 |
| 2,687,565 | Schaefer et al. | Aug. 31, 1954 |
| 2,704,884 | Ingels | Mar. 29, 1955 |
| 2,759,250 | Schaefer et al. | Aug. 21, 1956 |